United States Patent [19]
Ramer et al.

[11] Patent Number: 5,967,652
[45] Date of Patent: *Oct. 19, 1999

[54] APPARATUS FOR PROJECTING ELECTROMAGNETIC RADIATION WITH A TAILORED INTENSITY DISTRIBUTION

[75] Inventors: David P. Ramer, Dayton; Harold E. Watson, Kettering; Michael P. Ritter, Dayton; Bobby L. Epling, Bellbrook; Mark G. Schmitt, Huber Heights, all of Ohio; Jack C. Rains, Jr., Herndon, Va.

[73] Assignee: Advanced Optical Technologies, LLC, Chevy Chase, Md.

[*] Notice: This patent is subject to a terminal disclaimer.

[21] Appl. No.: 09/050,175

[22] Filed: Mar. 30, 1998

Related U.S. Application Data

[63] Continuation of application No. 08/590,290, Jan. 23, 1996, Pat. No. 5,733,028.

[51] Int. Cl.$^6$ .................................................. F21V 7/14
[52] U.S. Cl. .......................... 362/552; 362/559; 362/346
[58] Field of Search .................................. 362/551, 559, 362/560, 300, 311, 297, 298, 307, 552, 301, 302, 346

[56] References Cited

U.S. PATENT DOCUMENTS

| | | |
|---|---|---|
| 2,969,018 | 1/1961 | Erst et al. . |
| 3,637,309 | 1/1972 | Hosterman . |
| 3,777,160 | 12/1973 | Bernt . |
| 4,027,161 | 5/1977 | William et al. . |
| 4,144,556 | 3/1979 | Bond . |
| 4,309,746 | 1/1982 | Rushworth . |
| 4,443,706 | 4/1984 | DiMatteo et al. . |
| 4,667,112 | 5/1987 | Grossman . |
| 4,711,998 | 12/1987 | Malek . |
| 5,051,872 | 9/1991 | Anderson . |
| 5,103,381 | 4/1992 | Uke ........................................ 362/559 |
| 5,153,426 | 10/1992 | Konrad et al. . |
| 5,309,339 | 5/1994 | Webb . |
| 5,393,970 | 2/1995 | Shau et al. . |
| 5,510,893 | 4/1996 | Suzuki . |
| 5,519,534 | 5/1996 | Smith et al. . |
| 5,532,473 | 7/1996 | Chin . |
| 5,705,804 | 1/1998 | Ramer et al. . |
| 5,733,028 | 3/1998 | Ramer et al. . |
| 5,773,819 | 6/1998 | Ramer et al. . |

*Primary Examiner*—Sandra O'Shea
*Assistant Examiner*—Marshall Honeyman
*Attorney, Agent, or Firm*—McDermott, Will & Emery

[57] ABSTRACT

Apparatus is disclosed that efficiently projects electromagnetic radiation over a predetermined spherical sector with a tailored intensity distribution. The apparatus includes a base having a cavity and aperture that faces the spherical sector to be illuminated, with a flat, ring-shaped shoulder surrounding the aperture. The apparatus further includes a mask spaced over the aperture and a baffle projecting from the mask toward the aperture. The base, the mask, and the baffle are formed of a material having an outer surface with a significant diffuse, reflective characteristic. A source emits electromagnetic radiation (e.g., visible light) into the base cavity, and the base, mask and baffle are configured to redirect this radiation outwardly with the tailored intensity distribution (e.g., a uniform distribution) over the predetermined spherical sector (e.g., a hemisphere, or 2 πsteradians).

21 Claims, 3 Drawing Sheets

APPARATUS FOR PROJECTING ELECTROMAGNETIC RADIATION WITH A TAILORED INTENSITY DISTRIBUTION

This application is a continuation of application Ser. No. 08/590,290 filed Jan. 23, 1996 now U.S. Pat. No. 5,733,028.

BACKGROUND OF THE INVENTION

This invention relates generally to apparatus that project electromagnetic radiation over a predetermined spherical sector and, more particularly, to apparatus that project electromagnetic radiation with a tailored intensity distribution.

Apparatus of this particular kind are commonly used to project electromagnetic radiation, especially visible light, over a hemisphere, i.e., 2 πsteradians, for a variety of applications. Examples of such applications include use as a warning light on an emergency vehicle's light bar or as an aircraft warning light. In each case, the projected light has a predetermined intensity distribution, e.g., a uniform intensity profile over the hemisphere.

One type of apparatus of this kind is a translusive diffuser, which includes a sheet of translusive material disposed over a light source. Light from the light source passes through the translusive sheet and is diffused into the surrounding space. Suitable translusive materials include opal glass, acrylics, and Teflon. The translusive sheet sometimes is covered by a transparent protective dome or the sheet, itself, sometimes is formed into a dome shape. Although generally effective in projecting light substantially uniformly, translusive diffusers are considered to be unduly inefficient, projecting only about 20% to 25% of the available light when configured as a hemispherical light distributor.

Another type of apparatus of this kind is a beam redirector, which includes an optical device having a special refractive or reflective surface for redirecting light from a light source such as a laser into a hemisphere. Although such beam redirectors are relatively inexpensive to manufacture, they typically require a critical alignment between the light source and the optical device, and they typically require the use of a light source that provides a light beam having a known, stable intensity distribution. Moreover, the projected light often has a spatial intensity distribution that varies excessively.

It should, therefore, be appreciated that there is a need for an apparatus that projects electromagnetic radiation over a predetermined spherical sector, e.g., a hemisphere, with a tailored spatial intensity distribution, wherein the radiation is projected with greater efficiency and with less dependence on a critical alignment of optical components. The present invention fulfills this need.

SUMMARY OF THE INVENTION

The present invention is embodied in an apparatus that projects electromagnetic radiation over a predetermined spherical sector, with a tailored spatial intensity distribution, wherein the radiation is projected with improved efficiency and with less dependence on a critical alignment of optical components. The apparatus includes a base that faces the spherical sector to be illuminated, a mask that is spaced a predetermined distance from the base, and a source that emits electromagnetic radiation into the space between the base and the mask. In addition, a cavity and aperture are formed in one of the base and mask, facing the other of the base and the mask. The base and the mask are formed of a material having an outer surface with a significant diffuse reflective characteristic, and they are configured to redirect the emitted radiation with the tailored spatial intensity distribution (e.g., a uniform distribution) over the predetermined spherical sector.

In a more detailed feature of the invention, the cavity is formed in the base, and the base further includes a flat, ring-shaped shoulder that encircles the cavity's aperture. In addition, the apparatus further includes a baffle disposed between base cavity and the mask and preferably integral with, or otherwise secured to, the mask. For embodiments in which electromagnetic radiation is to be projected with an intensity distribution that is circumferentially symmetrical, the base's cavity and shoulder, the mask, and the baffle all are circumferentially symmetrical and are arranged in a coaxial relationship. In addition, the aperture is substantially circular, and the mask is substantially disk shaped. Further, for embodiments that project radiation with a substantially uniform intensity over the entire spherical sector, the diameter of the disk-shaped mask is slightly smaller than that of the aperture.

The baffle can have any of several suitable forms. For example, it can be substantially conical and project toward the base cavity from the center of the disk-shaped mask, or it can include a plurality of walls that project toward the base cavity from the mask's underside. The source can include an optical fiber that terminates within the base cavity, coaxial with the aperture, or it can include a lamp located on the mask's underside, adjacent to the baffle.

In another more detailed feature of the invention, suitable when the electromagnetic radiation includes visible light, the base, the mask, and the baffle all are formed of a Lambertian, polymeric material having a reflectance of at least about 99% for visible wavelengths. The intensity of the light projected by the apparatus, at each point in the predetermined spherical sector, is at least about 80% of its peak intensity over the predetermined spherical sector.

Other features and advantages of the present invention should become apparent from the following description of the preferred embodiments, taken in conjunction with the accompanying drawings, which illustrate, by way of example, the principles of the invention.

DESCRIPTION OF THE PREFERRED EMBODIMENTS

Figure 1:
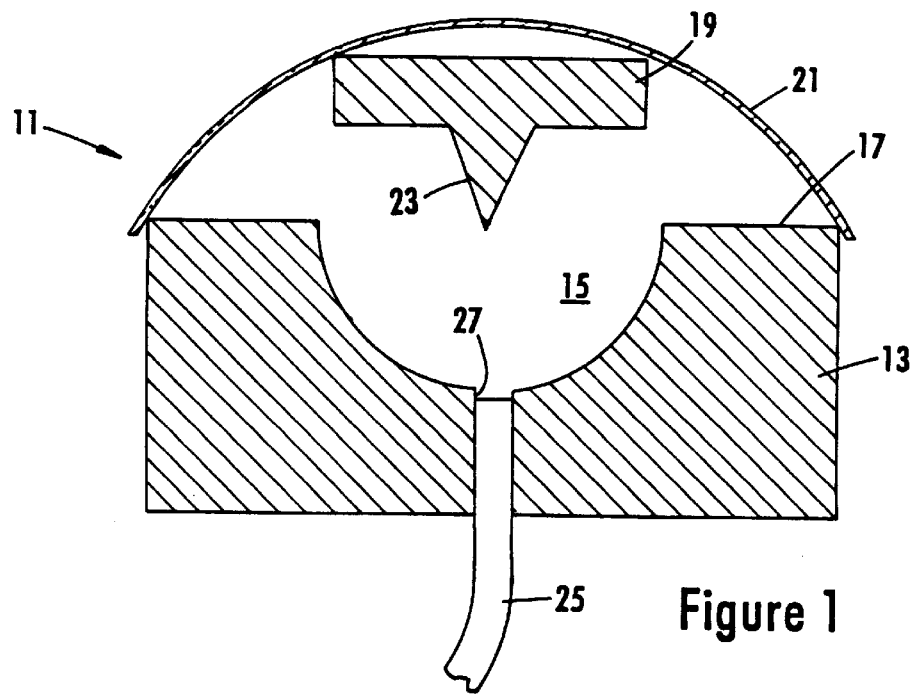
FIG. 1 is a side cross-sectional view of a first embodiment of a light distributor in accordance with the invention. This embodiment projects light received via an optical fiber substantially uniformly over a hemisphere.

With reference to the drawings, for purposes of illustration, and particularly to FIG. 1, there is shown a first embodiment of a light distributor apparatus 11 that projects light over a hemisphere, or 2 πsteradians, with an intensity distribution that is substantially uniform. The light distributor, which is useful, for example, as a warning light on a land vehicle or an aircraft, includes a disk-shaped base 13 having a hemispherical cavity 15 formed in its upper side, surrounded by a flat, ring-shaped shoulder 17. A disk-shaped mask 19 is disposed above the aperture of the base cavity, beneath a transparent dome 21 that covers the base's upper side. A conical baffle 23 projects downwardly from the center of the underside of the mask, toward the base cavity. Further, an optical fiber 25 is disposed in a narrow passageway 27 formed in the base 13, which terminates at the bottom of the cavity 15, coaxial with the cavity, the mask 19, and the conical baffle 23. The optical fiber delivers a beam of light into the cavity, which then is redirected outwardly so as to illuminate the adjacent hemisphere substantially uniformly.

The base 13, the mask 19, and the conical baffle 23 all are formed of a suitable diffuse reflective material such as Spectralon®, which is a highly reflective polymeric block material manufactured and sold by Labsphere, Inc., of North Sutton, N.H. This material is easily machined and very durable, and it provides a highly efficient Lambertian surface having a reflectance of more than 99%, for visible and near-infrared wavelengths. A Lambertian surface emits light with substantially uniform intensity in all directions. For protection, the base preferably encased in a plastic or metal housing (not shown). The transparent dome 21 is formed of a suitable material such as Pyrex®.

Alternatively, the base 13, the mask 19, and the conical baffle 23 could be constructed of a suitable base material of, for example, aluminum or plastic, with a coating of a diffuse reflective material such as barium sulfate or Spectralon. Other suitable materials, though less effective than the diffuse reflective materials identified above, include quasi-diffuse reflective materials, such as gloss white paint. The use of such materials provides improved performance over prior light distributors.

Light is delivered to the optical fiber 25 from a source (not shown), and it is emitted into the base cavity 15 with a generally Gaussian distribution, where it impinges initially on the conical baffle 23. The conical baffle is dimensioned to receive substantially all of the light initially emitted by the optical fiber. Diffuse reflection from the baffle redirects most of the light back into the cavity, but also redirects a portion the light radially outwardly from the light distributor 11, particularly at relatively low elevational angles. The light redirected back into the cavity is, on average, reflected many times between the cavity wall, the overlying baffle and mask 19, and the ring-shaped shoulder 17 before eventually being redirected outwardly through the transparent dome 21.

Figure 2:
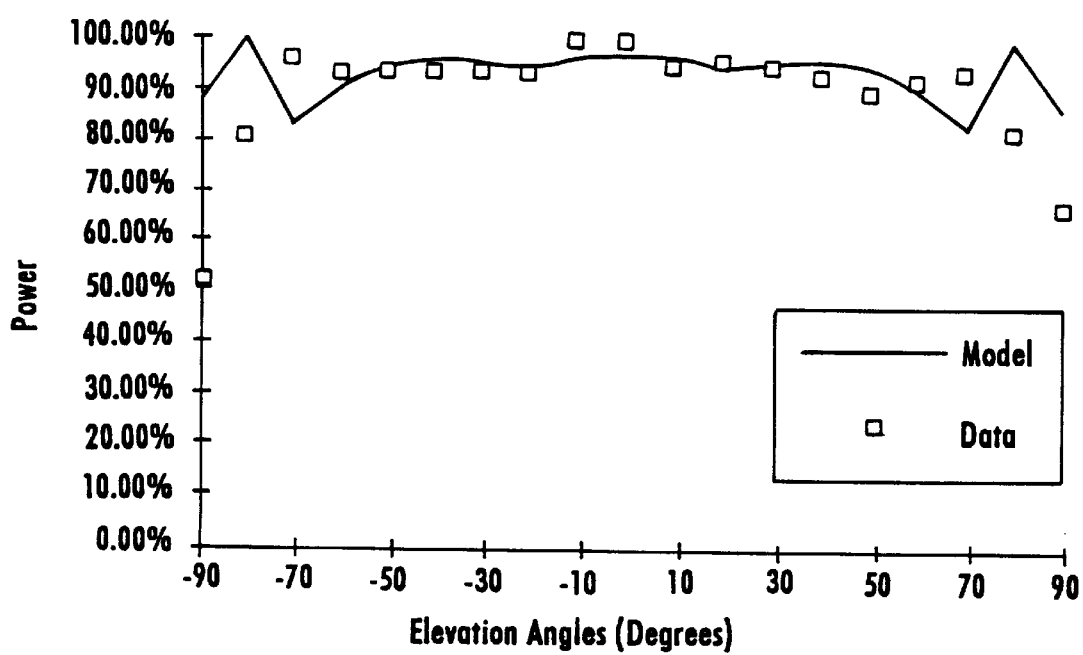
FIG. 2 is a graph depicting the intensity distribution of the light projected by the light distributor embodiment of FIG. 1, for elevation angles ranging from −90° to +90°. Data is shown for both a theoretical model of the light distributor and for an actual prototype.

FIG. 2 is graph depicting the intensity distribution of the light projected by both a theoretical model and an actual prototype of the light distributor 11 of FIG. 1, for elevation angles ranging from −90° to +90°. It will be noted that the intensity distribution for the theoretical model is substantially uniform over this entire range, even at elevational angles close to the horizon, where very little of the base cavity 15 is visible. Specifically, the intensity of light projected toward each point in the 2 π-steradian hemisphere being illuminated exceeds 80% of the peak intensity over the hemisphere. In addition, an upper horizon efficiency of greater than 95% is achieved.

The depicted intensity distribution for the actual prototype of the light distributor 11 varies from that of the theoretical model only at elevational angles close to the horizon. This variance is considered to result from a possible misalignment of the optical fiber 25 relative to the conical baffle 23 and/or from a non-symmetric intensity distribution of the light beam emitted by the fiber. These factors are considered to affect the intensity distribution only at low elevational angles.

The substantial uniformity of the light intensity distribution depicted in FIG. 2 is achieved by carefully configuring and dimensioning the cavity aperture, the mask 19, the conical baffle 23, and the shoulder 17. In the light distributor embodiment of FIG. 1, the disk-shaped base 13 has an overall diameter of 2.88 inches and a height of 1.25 inches, the base cavity 15 has a radius of 0.75 inches, the disk-shaped mask has a diameter of 1.2 inches and a thickness of 0.3 inches and its lower side is spaced 0.45 inches above the plane of the plane of the shoulder, and the baffle has a height of 0.45 inches and a base diameter of 0.75 inches.

It will be appreciated that the mask 19 provides constructive, or beneficial, occlusion of the underlying base cavity 15. The mask provides increased occlusion with increased elevation angle, to compensate for the cosine dependence of the cavity's effective size.

It also will be appreciated that a different, non-uniform intensity distribution for the projected light can be tailored by carefully altering the dimensions set forth above. For example, if a reduced intensity is desired for large elevation angles, the diameter of the mask 19 can be increased relative to that of the cavity 15. Conversely, if a reduced intensity is desired for low elevation angles, the conical baffle 23 can be reduced in size, or even eliminated. The specific dimensions required to provide a particular intensity distribution can be determined either empirically and/or using a straightforward geometric analysis that models the various surfaces as being Lambertian and the incident beam as having a Gaussian cross-section.

The ratio between the diameters of the mask 19 and the cavity aperture is an important parameter in optimizing the light distributor's intensity distribution over the entire 2 πsteradian hemisphere. In general, a more uniform response is obtainable if the mask/cavity diameter ratio is close to one; however, this ratio reduces the light clistributor's output efficiency. A mask/cavity diameter ratio of about 0.8 to 0.9 is preferred. This ratio provides a reasonably flat response, while maintaining a high output efficiency.

The elevation of the mask 19 above the base 13 is another important parameter in optimizing the light distributor's intensity distribution. In general, a thicker mask reduces the height at which optimum uniformity is achieved, and an increase in the mask/cavity diameter ratio reduces the height even more so.

The cavity diameter can be varied according to the power level of the light to be projected. The dimensions specified above are considered suitable for power levels of up to about 300 watts. For lower power applications, a smaller diameter might be desired.

Although the base cavity 15 is specified as having a hemispherical shape, the cavity's shape is not of critical importance. Practically any shape is effective, so long as it has a diffuse reflective surface. A hemisphere is preferred for the ease in modeling its azimuthal symmetry and for its ease in construction.

Figure 3:
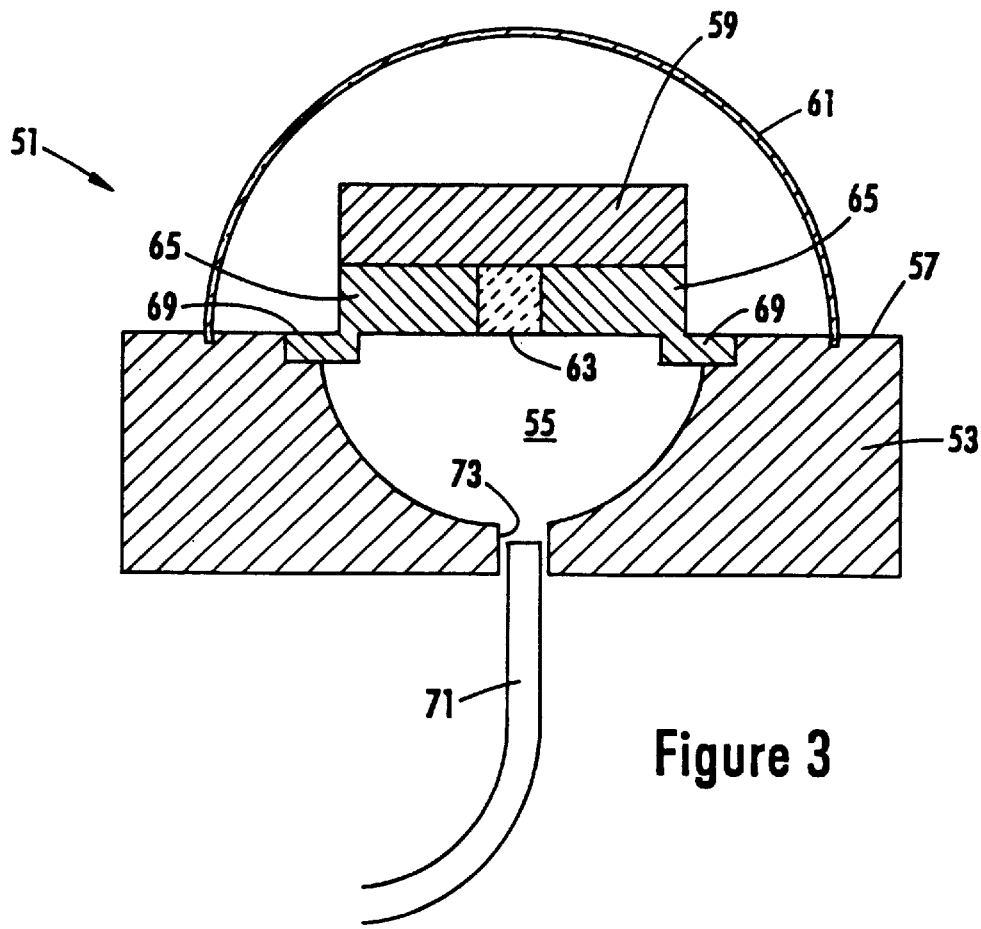
FIG. 3 is a side cross-sectional view of a third embodiment of a light distributor in accordance with the invention. Like the embodiment of FIG. 1, this embodiment projects light received via an optical fiber substantially uniformly over a hemisphere.
Figure 4:
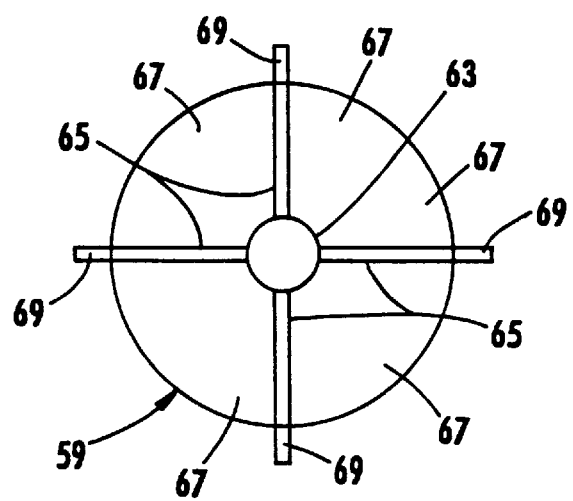
FIG. 4 is a bottom plan view of the mask portion of the light distributor of FIG. 3.

An alternative embodiment of a hemispheric light distributor 51 is depicted in FIGS. 3 and 4. It is similar to the light distributor 11 of FIG. 1, including a base 53 with a hemispherical cavity 55 formed in its upper side, surrounded by a flat, ring-shaped shoulder 57. A disk-shaped mask 59 is disposed above the aperture of the base cavity, beneath a transparent dome 61 that covers the base's upper side. In contrast to the light distributor of FIG. 1, the underside of the mask includes a circular center reflective region 63, with four baffle walls 65 extending away from it. The walls define four quadrants 67 on the mask's underside. Extensions 69 of the four baffle walls engage the base 53, to support the mask 59 in its desired position above the base. An optical fiber 71 is disposed in a narrow passageway 73 formed in the base 53, which terminates at the bottom of the cavity 55, coaxial with the cavity's centerline. The optical fiber emits a beam of light that falls initially on the center reflective region 63, from which it is redirected back into the cavity 55 and eventually, after multiple reflections, redirected outwardly so as to illuminate the adjacent hemisphere substantially uniformly. It will be appreciated that the optical fiber 71 alternatively could be skewed relative to the cavity's longitudinal axis, so long as the emitted beam initially impinges on the center region 63.

Figure 5:
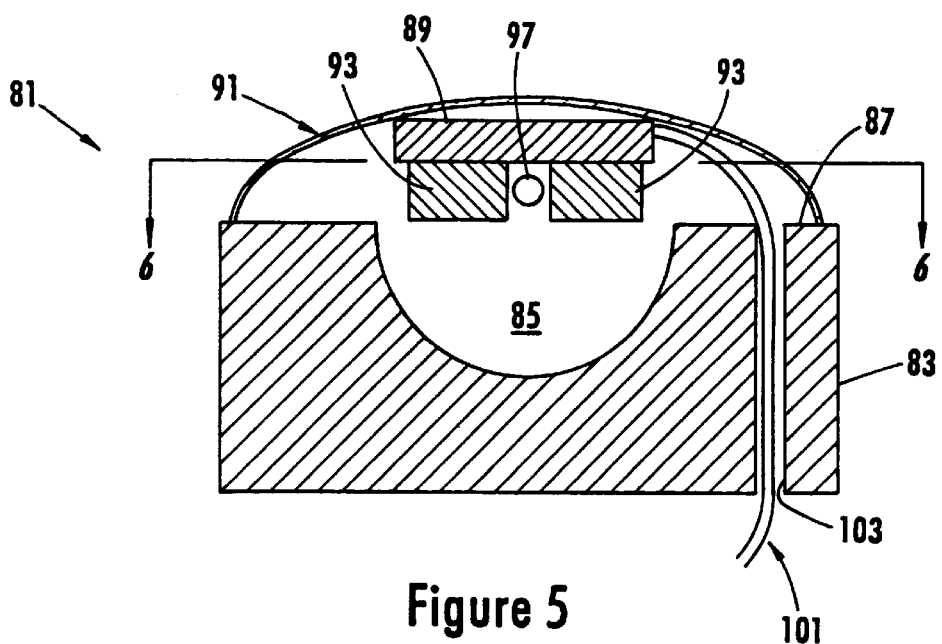
FIG. 5 is a side cross-sectional view of a second embodiment of a light distributor in accordance with the invention. This embodiment projects light emitted by an elongated lamp substantially uniformly over a hemisphere.
Figure 6:
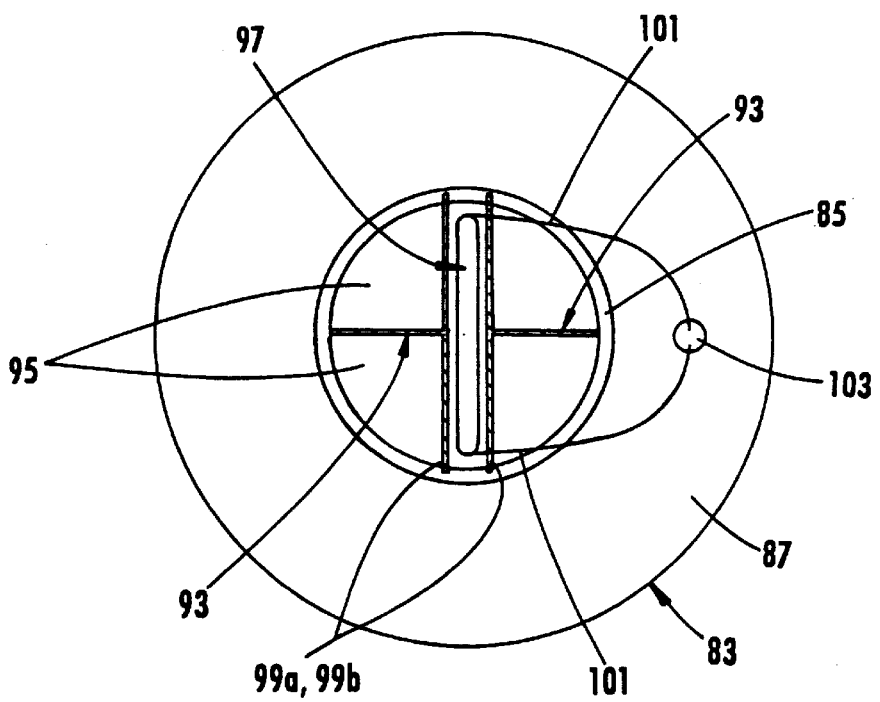
FIG. 6 is a cross-sectional view of the hemispherical light distributor of FIG. 5, taken substantially in the direction of the arrows 6—6 in FIG. 5.

Another alternative embodiment of a hemispheric light distributor 81 is depicted in FIGS. 5 and 6. It includes a disk-shaped base 83 having a hemispherical cavity 85 formed in its upper side, surrounded by a flat, ring-shaped shoulder 87. A disk-shaped mask 89 is disposed above the aperture of the base cavity, suspended from a transparent dome 91 that covers the base's upper side. An assembly of baffles 93 projects downwardly from the underside of the mask, toward the base cavity, to divide the mask into four quadrants 95. An elongated lamp 97, for example a miniature fluorescent lamp, also is located on the underside of the mask, between two closely spaced baffles 99a and 99b of the baffle assembly. Electrical power for the lamp, is supplied on power leads 101 that extend through a passageway 103 formed in the base 83. The height of the baffles exceeds that of the lamp, such that the lamp is not visible from the light distributor's side. Light from the lamp, therefore, is emitted downwardly into the cavity 85, and then is redirected outwardly so as to illuminate the adjacent hemisphere substantially uniformly.

In yet another alternative embodiment of the invention, not shown in the drawings, the intensity of the projected light at low elevation angles can be enhanced by beveling the mask's peripheral edge and by configuring the beveled surface to be specularly reflective. A large proportion of light incident on the beveled surface from the base cavity is redirected at such low elevation angles.

It should be appreciated from the foregoing description that the present invention provides a light distributor that projects light over a hemisphere with substantially improved uniformity and efficiency. The light distributor includes a base having a cavity with an aperture surrounded by a flat, ring-shaped shoulder, and further includes a mask spaced over the cavity aperture and a baffle projecting from the mask toward the cavity. A light source emits a light beam into the base cavity, and this light then is redirected outwardly by multiple reflections from the base, mask and baffle. The base, the mask, and the baffle are formed of a diffuse, reflective material, and they are configured such that the projected light has an intensity distribution that is substantially uniform over 2 $\pi$steradians, even at relatively low elevational angles.

Although the invention has been described with reference only to the presently preferred embodiments, those skilled in the art will appreciate that various modifications can be made without departing from the invention. Accordingly, the invention is defined only by the following claims.

We claim:

1. A system for projecting electromagnetic radiation, comprising:

(a) a base having a defined reflective area substantially facing a region to be illuminated with the electromagnetic radiation;

(b) a mask spaced between the base and the region to be illuminated and spaced a predetermined distance from the base, said mask having a defined reflective area substantially facing the reflective area of the base;

(c) a cavity formed in one of the reflective area of the base and the reflective area of the mask, said cavity comprising a reflective surface and an opening, a perimeter of the opening of the cavity forming an aperture; and (d) a source configured to emit electromagnetic radiation into the cavity, wherein the mask is positioned relative to the base and configured so as to constructively occlude [light] electromagnetic radiation emerging from the aperture of the cavity with respect to illumination of the region, to thereby tailor an intensity distribution of the system over a range of angles in the region to be illuminated.

2. A system as in claim 1, wherein the source comprises a light source optically coupled to the cavity.

3. A system as in claim 1, wherein the reflective area of the base comprises a diffusely reflective surface facing the region to be illuminated.

4. A system as in claim 1, wherein the reflective area of the mask comprises a diffusely reflective surface facing the reflective area of the base.

5. A system as in claim 1, wherein the reflective surface of the cavity has a substantially diffuse reflective characteristic with respect to the electromagnetic radiation.

6. A system as in claim 1, wherein the cavity comprises a segment of a sphere.

7. A system as in claim 7, wherein the cavity comprises a hemisphere.

8. A system as in claim 1, further comprising a baffle disposed between the base and the mask and confronting the cavity, the baffle being formed of a material having an outer surface with a reflective characteristic and being configured to cooperate with the base and the mask to redirect electromagnetic radiation emitted through the aperture of the cavity over the region to be illuminated with the tailored intensity distribution.

9. A system as in claim 1, wherein:

the cavity is defined in the base, and the aperture faces the mask;

the aperture and the mask are circumferentially symmetrical and are disposed in a coaxial relationship; and the cavity and mask are configured to redirect electromagnetic radiation emitted by the source such that said tailored intensity distribution is circumferentially symmetrical.

10. A system as in claim 9, wherein:

the aperture is substantially circular and the mask is substantially disk shaped; and the aperture and the mask are disposed in a coaxial relationship.

11. A system as in claim 10, wherein the tailored intensity distribution is substantially uniform with respect to angle of emission from the system about the axis of the aperture and mask, over a continuous, substantial range of angles within the region to be illuminated.

12. An apparatus for projecting electromagnetic radiation over a predetermined sector, comprising:

a substantially circular base for facing toward the predetermined sector, said base being formed of a material having an outer surface with a significant diffuse reflective characteristic, said base comprising a cavity defining an aperture facing toward the predetermined sector and a flat ringshaped shoulder surrounding the aperture;

a substantially disk shaped mask spaced a predetermined distance from the base and positioned relative to the base such that the aperture faces the mask, the aperture and the mask being symmetrical and disposed in coaxial relationship, said mask being formed of a material having an outer surface with a significant diffuse reflective characteristic;

a baffle projecting from the mask toward the cavity, the baffle being disposed in coaxial relationship to the mask and aperture; and a source configured to emit electromagnetic radiation into the cavity, wherein the apparatus is configured to redirect electromagnetic radiation emitted by the source to project the electromagnetic radiation with a symmetrical and substantially uniform intensity distribution over the predetermined sector.

13. An apparatus as in claim 12, wherein:

the baffle has a conical shape and projects from the mask toward the aperture; and the source includes an optical fiber that terminates within the base cavity, coaxial with the aperture and the conical baffle.

14. An apparatus as defined in claim 12, wherein the width of the mask is slightly smaller than the width of the aperture.

15. An apparatus as defined in claim 12, wherein:

the electromagnetic radiation emitted by the source includes visible light; and the base, the mask, and the baffle all comprise a Lambertian, polymeric material having a highly diffuse surface reflectance at visible wavelengths.

16. An apparatus for projecting electromagnetic radiation, comprising:

a base having a cavity with a substantially circular aperture for facing toward a region that is to be illuminated and a substantially flat shoulder encircling the aperture, said cavity having a substantially diffuse reflective characteristic with respect to the electromagnetic radiation, and the flat shoulder having a reflective characteristic with respect to the electromagnetic radiation;

a substantially disc-shaped mask disposed coaxial with and spaced from the aperture so as to occlude a substantial portion of the aperture, said mask comprising an outer surface facing toward the aperture which has a significant reflective characteristic, wherein the base aperture and mask are circumferentially symmetrical;

a reflective baffle projecting from the mask toward the base aperture, wherein the base aperture, the mask and the baffle are disposed in a coaxial relationship; and a source configured to emit electromagnetic radiation into the cavity; wherein:

the apparatus is configured to project electromagnetic radiation with a substantially uniform intensity distribution over a predetermined sector, and the intensity distribution is circumferentially symmetrical.

17. Apparatus for projecting electromagnetic radiation, comprising:

a base having a defined, diffusely reflective area for facing toward a region to be illuminated;

a mask spaced a predetermined distance from the base, said mask comprising a defined, diffusely reflective area facing substantially toward the reflective area of the base;

a diffusely reflective cavity formed in one of the reflective area of the base and the reflective area of the mask; and a source configured for emission of electromagnetic radiation into the cavity, wherein:

the mask and the cavity are configured such that the mask occludes a substantial portion of electromagnetic radiation from the source emerging from the cavity with respect to the region to be illuminated, such that the apparatus emits electromagnetic radiation with a substantially uniform intensity distribution over the region to be illuminated.

18. An apparatus as in claim 17, wherein the intensity distribution is substantially uniform with respect to angle of emission over a range of angles within a sector.

19. An apparatus as in claim 18, wherein the sector over which the intensity distribution is substantially uniform with respect to angle of emission is substantially hemispherical.

20. A system for projecting electromagnetic radiation, comprising:

(a) a base having a defined reflective area comprising a diffusely reflective surface facing a region to be illuminated with the electromagnetic radiation;

(b) a mask spaced between the base and the region to be illuminated and spaced a predetermined distance from the base, said mask having a defined reflective area substantially facing the reflective area of the base;

(c) a cavity formed in one of the reflective area of the base and the reflective area of the mask, said cavity comprising a reflective surface; and (d) a source configured to emit electromagnetic radiation into the cavity, wherein the mask is positioned relative to the base and configured so as to constructively occlude electromagnetic radiation emerging from an aperture of the cavity with respect to the region to be illuminated, to thereby tailor an intensity distribution of the system over a range of angles in the region to be illuminated.

21. A system for projecting electromagnetic radiation, comprising:

(a) a base having a defined reflective area substantially facing a region to be illuminated with the electromagnetic radiation;

(b) a mask spaced between the base and the region to be illuminated and spaced a predetermined distance from the base, said mask having a defined reflective area substantially facing the reflective area of the base;

(c) a cavity formed in one of the reflective area of the base and the reflective area of the mask, said cavity comprising a reflective surface, the reflective surface of the cavity having a substantially diffuse reflective characteristic with respect to the electromagnetic radiation; and (d) a source configured to emit electromagnetic radiation into the cavity, wherein the mask is positioned relative to the base and configured so as to constructively occlude electromagnetic radiation emerging from an aperture of the cavity with respect to the region to be illuminated, to thereby tailor an intensity distribution of the system over a range of angles in the region to be illuminated.

* * * * *